United States Patent Office 3,578,501
Patented May 11, 1971

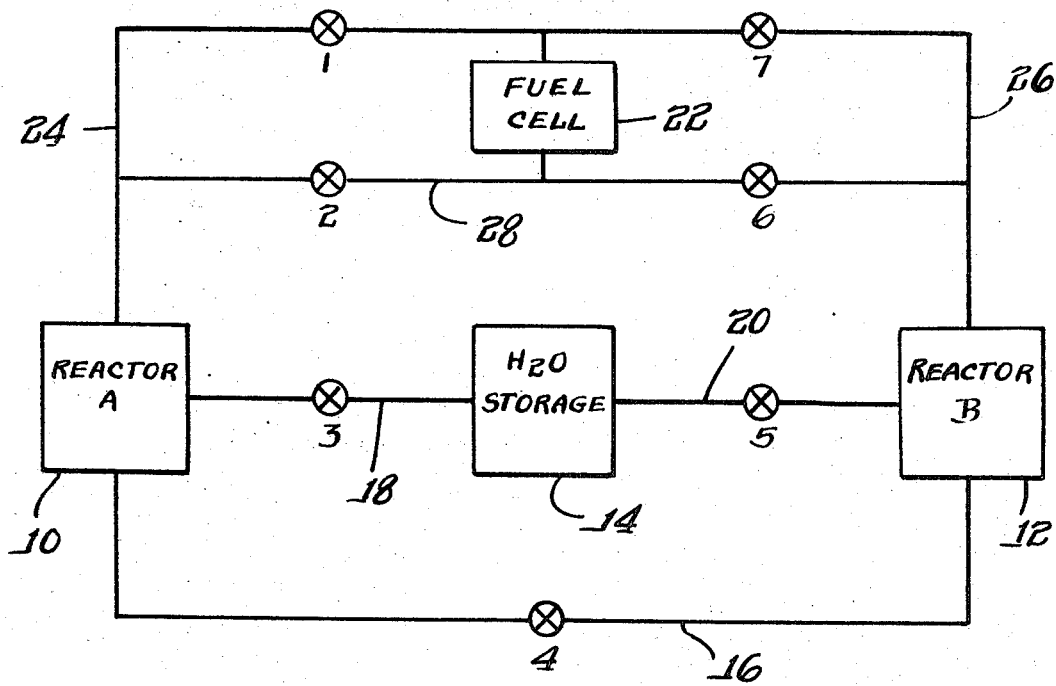

3,578,501
FUEL CELL SYSTEM AND METHOD USING LITHIUM AND LITHIUM HYPOCHLORITE TO PRODUCE HYDROGEN AND OXYGEN
Sammy C. Honeycutt, Gastonia, N.C., assignor to Lithium Corporation of America, New York, N.Y.
Filed Nov. 13, 1968, Ser. No. 775,455
Int. Cl. H01m 27/14
U.S. Cl. 136—86    9 Claims

ABSTRACT OF THE DISCLOSURE

Regenerative hydrogen-oxygen fuel cell system in which gaseous hydrogen and oxygen are separately generated and conveyed to a hydrogen-oxygen fuel cell associated with the system. Hydrogen is generated by the action of water on lithium metal. Oxygen is generated by heating an aqueous solution containing lithium hypochlorite. The system is regenerated by converting the lithium chloride, resulting from the thermal decomposition of lithium hypochlorite, to lithium metal, and by converting the lithium hydroxide monohydrate, obtained from the action of water on the lithium metal, to lithium hypochlorite.

---

Hydrogen-oxygen fuel cell systems are well known. While such systems have, in certain respects, been developed to a high degree, they possess a number of disadvantages as sources of power, particularly for vehicle propulsion purposes. Thus, for example, the hydrogen and oxygen used in the systems commonly are supplied in cylinders, under considerable pressure. The cylinders are heavy and bulky, and present a serious explosion hazard in the even of rupture due to severe impact, or other cause. These factors are of especial concern in those instances where such systems are employed as power sources in orbiting satellites, guided missiles, rockets, and related space vehicles, and have led to the development of lighter weight, safer fuel cell systems. One such development is the lithium metal anode fuel cell. The low atomic weight and high chemical activity of lithium metal make it particularly suitable for use in high energy density devices. However, the high reactivity of the metal has led to problems in the selection of an electrolyte to be used in connection with it. Aqueous electrolytes are not satisfactory due to the high reactivity of lithium metal with water. Perhaps the two most promising electrolytes are organic solvents containing dissolved salts for use at low temperatures, and fused salts for use at high temperatures. Fuel cells employing low temperature operating organic solvent dissolved salts as electrolytes, however, are characterized by low current density and, consequently, low power density. Fuel cells, on the other hand, employing a fused salt as an electrolyte, while exhibiting high power densities, require high temperatures to fuse the salt and to keep it molten. These considerations have placed serious limitations on the use of lithium metal in high energy density devices, especially fuel cells for use in space vehicles.

In accordance with the present invention a hydrogen-oxygen fuel cell system is provided which enables the low atomic weight and high chemical reactivity of lithium metal to be taken full advantage of concomitantly with the simplicity and dependability of a hydrogen-oxygen fuel cell. The fuel cell system is characterized, among other things, by its high energy density, its ability to provide a high current density at ambient temperature, and its regenerative capabilities. These factors, coupled with the reliability and compactness of the system, make it especially suitable for use as a high energy density device in space vehicles.

Briefly, the fuel system of this invention involves (a) reacting lithium metal with water to generate gaseous hydrogen, (b) heating an aqueous solution containing lithium hypochlorite and lithium chloride to generate gaseous oxygen, and (c) separately feeding or passing the gaseous hydrogen and oxygen so generated to a hydrogen-oxygen fuel cell. The system is completely discharged when substantially all of the lithium metal has been converted to lithium hydroxide monohydrate and the lithium hypochlorite has been converted to lithium chloride. As indicated, the power generation cycle takes place at ambient temperature. The energy density of the system is of the order of 180 watt hours per pound of reactants. Regeneration, or recharging, of the system is achieved by first drying the lithium chloride and electrolyzing it to produce lithium metal and chlorine gas. The chlorine gas is passed into the lithium hydroxide monohydrate solution, resulting from the oxygen generating reaction between the lithium metal and water, to give an essentially equimolar solution of lithium chloride and lithium hypochlorite. Both the power generation and regeneration cycles of the system can take place in a closed, automated arrangement requiring minimal space and no specialized equipment.

The rate at which hydrogen gas is generated in the system is dependent upon the rate at which water is contacted with the lithium metal. Due to the highly reactive, exothermic character of the reaction between lithium metal and water, the water advantageously is incrementally added to the lithium metal at a rate sufficient to meet power out-put needs. To this end, the rate of water addition can be automatically and selectively controlled.

The rate at which gaseous oxygen is generated in the system, on the other hand, is dependent, in the main, upon the amount of heat applied to the aqueous lithium hypochlorite-lithium chloride solution. Since, under the influence of heat, the rate of decomposition of lithium hypochlorite in solution is relatively rapid, only moderate temperatures are required to attain gaseous oxygen generation in the system. Generally speaking, temperatures of the order of about 20° C. to about 80° C., usually about 40° C. to about 60° C. or 65° C., are sufficient for the purposes of the present invention. The exothermic reaction between the lithium metal and water to generate hydrogen gas in the system advantageously can be utilized as the heat source for heating the lithium hypochlorite-lithium chloride solution to generate gaseous oxygen.

The reactions involved in the generation of gaseous hydrogen and oxygen in the system can be represented by the following equations:

Hydrogen gas generation
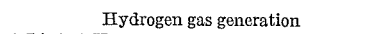

Oxygen gas generation
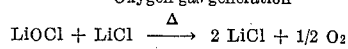

Power generation in the system takes place in the fuel cell by the reaction between the hydrogen and oxygen gas which can be represented by the following equation:

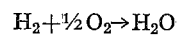

Regeneration, or recharging, of the system is carried out in two stages which, as indicated hereinabove, involve first drying the lithium chloride, resulting from the heat induced decomposition of lithium hypochlorite, and then electrolyzing the dried lithium chloride. Drying and electrolysis of the lithium chloride advantageously takes place in the same container, or vessel, utilized for the lithium hypochlorite-lithium chloride solution. Following drying, the lithium chloride is fused. In order to provide a low melting medium in which to carry out the electrolysis of the lithium chloride, a compatible salt, such as potassium chloride, is added to the container or vessel.

The salt advantageous is incorporated in the starting lithium hypochlorite-lithium chloride solution and is employed in an amount such that the ratio of lithium chloride to the salt present in the vessel, after oxygen gas generation has creased, will be about 3:2. For reasons that will become clear hereinafter, a like amount of the salt, in solid, substantially anhydrous form, is added to the container, or vessel, wherein hydrogen gas generation initially take place. A lithium chloride-potasium chloride mixture wherein the components are present in the approximate ratio stated will have a fusion temperature of the order of about 400° C. to about 475° C., usually about 440° C. to about 450° C. Electrolysis is carried out at a temperature in the range of about 440° C. to 460° C., most desirably about 450° C. The vessel containing the fused mixture conveniently can serve as the negative electrode. The positive electrode may take various forms. Thus, for example, the positive electrode may comprise a hollow tube, formed of carbon, having a porous tip. The tip is immersed in the fused mixture, and the chlorine gas produced during electrolysis passes through the tip into the center of the hollow carbon tube from where it is conveyed to the container, or vesel, containing the lithium hydroxide monohydrate formed by the reaction between the lithium metal and water. The heat for drying and fusing the lithium chloride-potassium chloride mixture desirably is provided by an outside source, as is the electrical energy for the electrolysis.

The lithium hypochlorite regeneration is carried out by permiting the chlorine gas from the lithium metal regeneration to react with the lithium hydroxide monohydrate. The reaction between the gas and the hydroxide produces lithium hypochlorite, lithium chloride and water. The temperature during the reaction advantageously should be maintained at least 15° C. to 30° C., especially desirably from about 20° C. to about 25° C. Addition of chlorine gas should be stopped as soon as the lithium hydroxide monohydrate has been neutralized. In the system of this invention, the possibility of adding an excess of chlorine gas to the lithium hydroxide monohydrate is substantially eliminated since the quantity of the various chemical components utilized in the system is such that only the correct amount of chlorine gas required to convert the lithium hydroxide monohydrate to lithium hypochlorite will be produced by the electrolysis of the lithium chloride.

The reactions involved in the regeneration of the system of this invention can be represented by the following equations:

Lithium regeneration

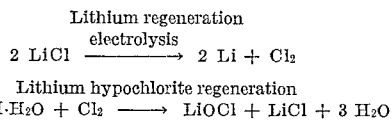

$$2 \text{ LiCl} \xrightarrow{\text{electrolysis}} 2 \text{ Li} + \text{Cl}_2$$

Lithium hypochlorite regeneration $$2 \text{ LiOH} \cdot \text{H}_2\text{O} + \text{Cl}_2 \longrightarrow \text{LiOCl} + \text{LiCl} + 3 \text{ H}_2\text{O}$$

The system of the present invention has the important advantage of requiring only a minimum number of containers, or vessels, in which to carry out the various reactions described above. More specifically in this connection, the reaction between the lithium metal and water to generate hydrogen gas, and the conversion of the lithium hydroxide monohydrate formed as a result of said reaction, can be carried out in a single vessel. Similarly, the heating of the lithium hypochlorite-lithium chloride solution, and the electrolysis of the lithium chloride formed by the thermal decomposition of the lithium hypochlorite can be carried out in a single vessel. The only other starting material container, or vessel, required for the system will hold the water to be reacted with the lithium metal and to dissolve the lithium hydroxide monohydrate.

It will be noted that the reactions carried out in each of the two vesels are reversed after each successive power generation and regeneration cycle. That is, whereas hydrogen gas generation, for example, was carried out in one vessel during any one power generation cycle, during the next power generation cycle, following regeneration of the system, oxygen gas generation will take place in that vessel. This reversibility of function of the vessels, together with the nature of the reactants and the fact that only three vessel are required for them, provides a high energy density system which is light in weight and capable of compact arrangement.

In the accompanying drawing, an embodiment of the system of the present invention is illustrated in somewhat schematic form. Reactor A, designated by numeral 10, is initially charged with lithium metal and potassium chloride. Reactor B, designated by numeral 12, is initially charged with an aqueous solution of lithium hypochlorite, lithium chloride and potassium chloride. The vessel 14 contains sufficient water to react, at ambient temperature, with the lithium and dissolve the lithium hydroxide monohydrate formed during hydrogen gas generation. Reactor A and Reactor B are interconnected by a conduit 16 having an on-off valve 4 positioned therealong. Reactor A is connected to vessel 14 by a conduit 18 having an on-off valve 3 positioned therealong, while Reactor B is connected to vessel 14 by a conduit 20 having an on-off valve 5 positioned therealong. Reactor A and Reactor B also are connected to a hydrogen-oxygen fuel cell 22 by conduits 24 and 26, respectively, provided with on-off valves 1 and 7, respectively, positioned on opposite sides of the fuel cell 22. A by-pass conduit 28, connected to the fuel cell 22 and to the conduits 24 and 26 is provided. The conduit 28 has on-off valves 2 and 6 positioned therealong on opposite sides of the fuel cell 22.

By way of specific illustration, in its charged condition, a system, as shown in the drawing, capable, for example, of producing one Faraday of electricity, would contain 725 grams of water in the vessel 14. The Reactor A will contain 14 grams of lithium metal along with 56 grams of solid, substantially anhydrous potassium chloride, while the Reactor B will contain a solution comprising 725 grams of water, 42 grams of lithium chloride, 58 grams of lithium hypochlorite and 56 grams of potassium chloride. The potassium chloride, as indicated hereinabove, is present in an amount to provide a ratio of approximately 3:2 of lithium chloride to potassium chloride in the reactors . The total amount of water present in the system, as stated, is determined by the amount of water required to react with the lithium metal and to dissolve the lithium hydroxide monohydrate at ambient temperature. Thus, for example, the solubility of lithium hydroxide monohydrate at 25° C. is reported to be 12.9 grams per 100 grams of water or 326 grams of water per gram molecular weight of lithium hydroxide monohydrate. Therefore, the total amount of water required to react with the lithium metal and to dissolve the monohydrate is 725 grams. Also, 725 grams of water are present in the Reactor B. Thus, 1450 grams of water will be present in the system. One gram molecular weight of water is formed during a cycle. This can be recycled.

In its fully charged condition, all of the on-off valves of the system are closed. To generate power, water from the vessel 14 is brought into contact with the lithium metal in the Reactor A at a preselected, controlled rate, and heat is applied to the Reactor B. During power generation, on-off valves 1, 3 and 6 are open, while valves 2, 4, 5 and 7 are closed, thus enabling the hydrogen and oxygen to reach the fuel cell 22. The system is in its discharged condition when substantially all of the lithium metal has been converted to lithium hydroxide monohydrate and the lithium hypochlorite has been converted to lithium chloride. All valves are closed when the system has been fully discharged. In this condition, the vessel 14 will be empty. The Reactor A will contain approximately 653 grams of water, 84 grams of lithium hydroxide monohydrate and 56 grams of potassium chloride. The Reactor B, on the other hand, will contain approximately 84 grams of lithium chloride, 56 grams of potassium chloride and 725 grams of water.

To regenerate or recharge the system, the lithium chloride in Reactor B is first dried. During drying, valve 5 is open. All of the other valves are closed. After the lithium chloride has been dried, it is electrolyzed to produce lithium metal and chlorine gas. The gas is conveyed to Reactor A through conduit 16. All of the valves, except valve 4, are closed during this operation. The chlorine gas is reacted with the lithium hydroxide monohydrate in Reactor A to form lithium hypochlorite, lithium chloride and water. Following completion of this reaction, the system is again in a fully charged condition, and all valves are closed, as before.

In the next power generation cycle, water from the vessel 14 is brought into contact with the lithium metal in Reactor B, and heat is applied to the solution of lithium hypochlorite in Reactor A. Valves 2, 5 and 7 are open, and valves 1, 3, 4 and 6 are closed during formation of gaseous hydrogen and oxygen. As before, all valves are closed when the system has been fully discharged. To regenerate, or recharge, the system, the lithium chloride in Reactor A is dried. Valve 3 is open during this operation. All of the remaining valves are closed. Following drying, the lithium chloride is electrolyzed, and the chlorine gas produced is conveyed through conduit 15 and valve 4 to Reactor B where it is reacted with the lithium hydroxide monohydrate. Following formation of lithium hypochlorite, lithium chloride and water in Reactor B, the system is again in a fully charged condition, and all valves are closed in readiness for the next power generation cycle.

The theoretical energy density of the system just described is readily calculated from the free energy of formation of water and the weight of the reactants. The free energy of formation of water is approximately −56.7 Kcal. per mole, and the total weight of the reactants is 1676 grams. From this the theoretical energy density is calculated to be 178.5 watt hours per pound of reactants.

It should be understood that various modifications in the specific embodiment of the invention described will suggest themselves to those skilled in the art without departing from the scope of the invention, and that it is intended that the matter contained in the above description shall be interpreted as illustrative and not in a limiting sense.

What is claimed is:

1. In a method of providing gaseous hydrogen and oxygen to a hydrogen-oxygen fuel cell, the steps which comprise
   (a) providing a first container having lithium metal therein,
   (b) providing a second container having an aqueous solution comprising lithium hypochlorite and lithium chloride therein,
   (c) controllably adding water to said first container whereby the lithium metal reacts therewith to generate gaseous hydrogen and to form an aqueous solution of lithium hydroxide,
   (d) controllably heating the aqueous solution of lithium hypochlorite in said second container to generate gaseous oxygen and to form lithium chloride,
   (e) separately feeding the aforesaid generated gaseous hydrogen and oxygen to a hydrogen-oxygen fuel cell,
   (f) drying the lithium chloride produced in the above step (d) and subjecting it to electrolysis to produce lithium metal and chlorine gas,
   (g) passing said chlorine gas produced in step (f) into the aqueous solution of lithium hydroxide porduced in step (c) to form an aqueous solution of lithium hypochlorite and lithium chloride,
   (h) using said lithium metal produced in step (f) for reaction with water controllably to generate gaseous hydrogen and to form an aqueous solution of lithium hydroxide,
   (i) controllably heating said aqueous solution of lithium hypochlorite and lithium chloride to generate gaseous oxygen and to convert the lithium hypochlorite to lithium chloride, and
   (j) separately feeding the generated gaseous hydrogen in step (h) and the generated gaseous oxygen in step (i) to said hydrogen-oxygen fuel cell.

2. The method of claim 1, in which anhydrous potassium chloride is included in said first container together with said lithium metal.

3. The method of claim 1, in which potassium chloride is included in the aqueous solution of lithium hypochlorite in said second container.

4. The method of claim 3, in which the potassium chloride is present in a quantity such that, upon consumption of the lithium hypochlorite in the second container, the weight ratio of the lithium chloride to the potassium chloride in said second container will be about 3 to 2.

5. The method of claim 3, in which lithium chloride is included in the aqueous solution of lithium hypochlorite in said second container.

6. In a system for providing gaseous hydrogen and oxygen to a hydrogen-oxygen fuel cell, the combination which comprises:
   (a) a hydrogen-oxygen fuel cell,
   (b) a first container having lithium metal therein,
   (c) a second container having water therein in amount to react with all of the lithium metal in said first container and to dissolve the lithium hydroxide which forms in said first container upon the addition of the water thereto from said second container,
   (d) means to controllably feed water from said second container into contact with the lithium metal in said first container to generate gaseous hydrogen and to form an aqueous solution of lithium hydroxide in said first container,
   (e) means for feeding said gaseous hydrogen to said hydrogen-oxygen fuel cell,
   (f) a third container having an aqueous solution comprising lithium hypochlorite and lithium chloride therein,
   (g) means for controllably applying heat to the lithium hypochlorite in said third container to generate gaseous oxygen and to form an aqueous solution of lithium chloride,
   (h) means for feeding said gaseous oxygen to said hydrogen-oxygen fuel cell,
   (i) means for drying the lithium chloride formed in said third container, after gaseous oxygen generation has ceased, and for transferring the water driven off to said second container,
   (j) means for converting the dried lithium chloride in said third container to lithium metal and chlorine gas, and
   (k) means for conveying the chlorine gas to said first container to convert the aqueous solution of lithium hydroxide therein to an aqueous solution comprising lithium hypochlorite.

7. In a system according to claim 6 wherein said means of (f) and (h) includes on-off valve means.

8. In a system according to claim 6 wherein said means of (j) comprises electrolyzing means.

9. In a system according to claim 6 wherein generation of gaseous hydrogen takes place in said third container after the lithium chloride therein has been converted to lithium metal, and wherein generation of gaseous oxygen takes place in said first container after the aqueous solution of lithium hydroxide therein has been converted to a corresponding solution comprising lithium hypochlorite.

References Cited

UNITED STATES PATENTS

| | | | |
|---|---|---|---|
| 3,133,837 | 5/1964 | Eidensohn | 136—86 |
| 3,134,697 | 5/1964 | Niedrach | 136—86 |
| 3,336,162 | 8/1967 | Zachmann | 136—86 |
| 3,421,994 | 1/1969 | Le Duc | 136—86X |

ALLEN B. CURTIS, Primary Examiner